United States Patent [19]

Hirata

[11] Patent Number: 5,778,808
[45] Date of Patent: Jul. 14, 1998

[54] EMBROIDERY SEWING DEVICE AND EXTERNAL MEMORY MEDIUM FOR USE THEREWITH

[75] Inventor: Takashi Hirata, Nagoya, Japan

[73] Assignee: Brother Kogyo Kabushiki Kaisha, Nagoya, Japan

[21] Appl. No.: 742,834

[22] Filed: Oct. 31, 1996

[30] Foreign Application Priority Data

Nov. 6, 1995 [JP] Japan .................................. 7-311580

[51] Int. Cl.⁶ .............................. D05B 21/00; D05C 5/04
[52] U.S. Cl. ................... 112/102.5; 112/445; 364/470.09
[58] Field of Search ........................... 112/102.5, 470.06, 112/445, 458, 475.19, 470.01; 364/470.09

[56] References Cited

U.S. PATENT DOCUMENTS

| | | | |
|---|---|---|---|
| 5,228,403 | 7/1993 | Sugimoto | 112/470.04 X |
| 5,253,599 | 10/1993 | Hashiride | 112/445 X |
| 5,386,789 | 2/1995 | Futamura et al. | 112/475.19 X |
| 5,474,000 | 12/1995 | Mizuno et al. | 112/102.5 |
| 5,481,992 | 1/1996 | Fujimura | 112/475.19 X |

*Primary Examiner*—Peter Nerbun
*Attorney, Agent, or Firm*—Oliff & Berridge, PLC

[57] ABSTRACT

A sewing data processor capable of displaying embroidery patterns, including a display; an external memory medium detachably mountable to an external memory medium mounting portion and for storing pattern data relating to a embroidery patterns, each embroidery pattern including partial patterns each to be sewn in a corresponding thread color and storing thread color indication data each indicating a corresponding thread color for sewing a corresponding partial pattern; a pattern display controller for displaying the embroidery patterns on the display based on the pattern data; a character font memory storing display font data for displaying characters required to indicate each of the thread colors in a predetermined language using characters of the predetermined language, the display font data being stored under its lead address in the character font memory; a lead address table storing thread color indication data and lead addresses of the display font data, the thread color indication data indicating a corresponding one of the thread colors and being stored in correspondence with at least one lead address of display font data for displaying the corresponding one of the thread colors in at least a character of the predetermined language.

21 Claims, 16 Drawing Sheets

FIG. 4

| | | | |
|---|---|---|---|
| FIRST EMBROIDERY PATTERN "PANDA" | THREAD COLOR INDICATION DATA OF FIRST PARTIAL PATTERN | (25) | |
| | THREAD COLOR INDICATION DATA OF SECOND PARTIAL PATTERN | (13) | |
| | THREAD COLOR INDICATION DATA OF THIRD PARTIAL PATTERN | (8) | |
| | THREAD COLOR INDICATION DATA OF FOURTH PARTIAL PATTERN | (13) | |
| | THREAD COLOR INDICATION DATA OF FIFTH PARTIAL PATTERN | (14) | |
| SECOND EMBROIDERY PATTERN "ELEPHANT" | THREAD COLOR INDICATION DATA OF FIRST PARTIAL PATTERN | (12) | THREAD COLOR INDICATION TABLE |
| | THREAD COLOR INDICATION DATA OF SECOND PARTIAL PATTERN | (13) | |
| | THREAD COLOR INDICATION DATA OF THIRD PARTIAL PATTERN | (10) | |
| | THREAD COLOR INDICATION DATA OF FOURTH PARTIAL PATTERN | (11) | |
| | THREAD COLOR INDICATION DATA OF FIFTH PARTIAL PATTERN | (14) | |
| THIRD EMBROIDERY PATTERN "HORSE" | THREAD COLOR INDICATION DATA OF FIRST PARTIAL PATTERN | (21) | |
| | THREAD COLOR INDICATION DATA OF SECOND PARTIAL PATTERN | (15) | |
| | THREAD COLOR INDICATION DATA OF THIRD PARTIAL PATTERN | (12) | |
| | THREAD COLOR INDICATION DATA OF FOURTH PARTIAL PATTERN | (14) | |
| ⋮ | ⋮ | | |

FIG. 6

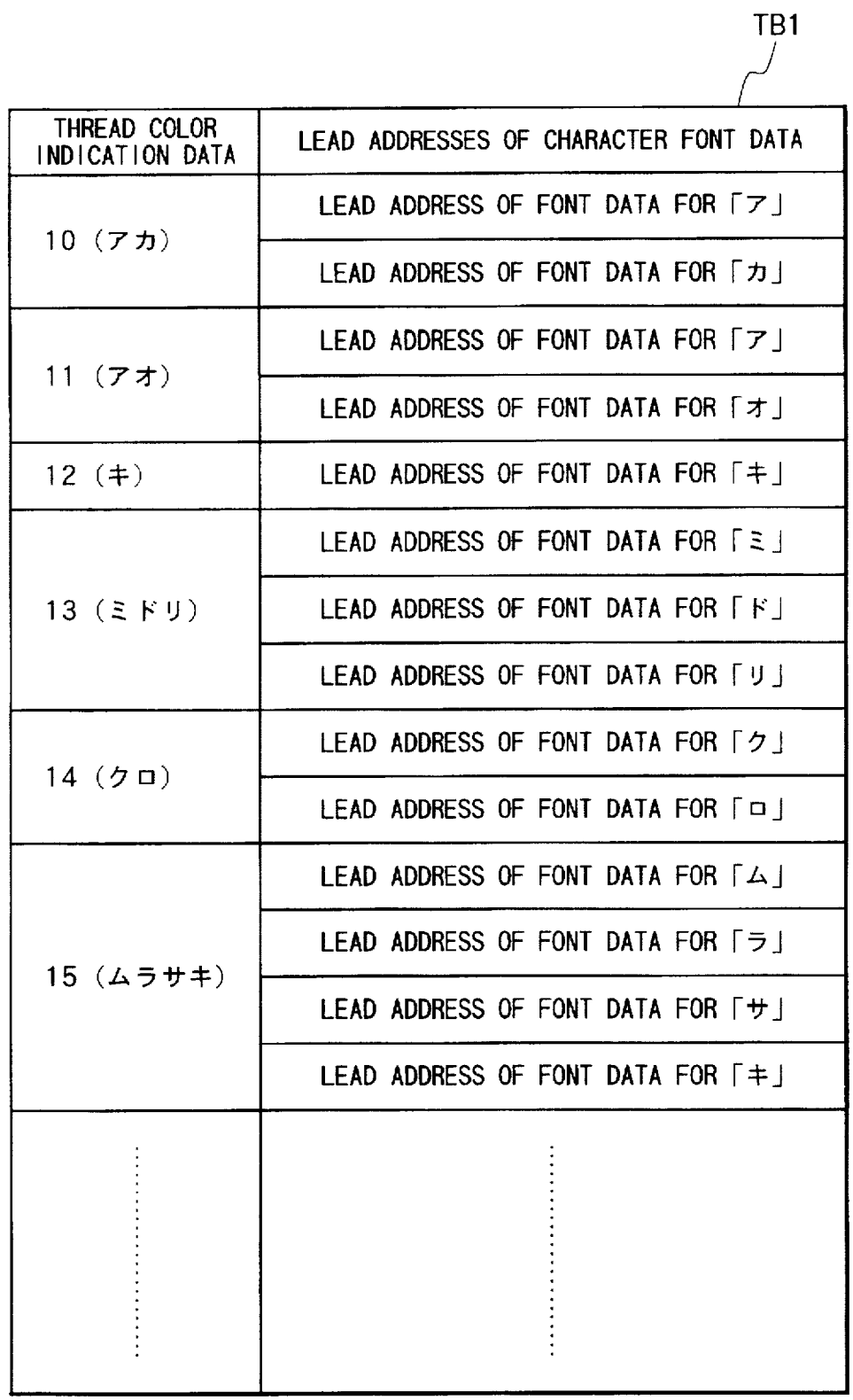

| THREAD COLOR INDICATION DATA | LEAD ADDRESSES OF CHARACTER FONT DATA |
|---|---|
| 10 (アカ) | LEAD ADDRESS OF FONT DATA FOR 「ア」 |
| | LEAD ADDRESS OF FONT DATA FOR 「カ」 |
| 11 (アオ) | LEAD ADDRESS OF FONT DATA FOR 「ア」 |
| | LEAD ADDRESS OF FONT DATA FOR 「オ」 |
| 12 (キ) | LEAD ADDRESS OF FONT DATA FOR 「キ」 |
| 13 (ミドリ) | LEAD ADDRESS OF FONT DATA FOR 「ミ」 |
| | LEAD ADDRESS OF FONT DATA FOR 「ド」 |
| | LEAD ADDRESS OF FONT DATA FOR 「リ」 |
| 14 (クロ) | LEAD ADDRESS OF FONT DATA FOR 「ク」 |
| | LEAD ADDRESS OF FONT DATA FOR 「ロ」 |
| 15 (ムラサキ) | LEAD ADDRESS OF FONT DATA FOR 「ム」 |
| | LEAD ADDRESS OF FONT DATA FOR 「ラ」 |
| | LEAD ADDRESS OF FONT DATA FOR 「サ」 |
| | LEAD ADDRESS OF FONT DATA FOR 「キ」 |
| ⋮ | ⋮ |

| THREAD COLOR INDICATION DATA | LEAD ADDRESSES OF CHARACTER FONT DATA |
|---|---|
| 10 (RED) | LEAD ADDRESS OF FONT DATA FOR 「R」 |
| | LEAD ADDRESS OF FONT DATA FOR 「E」 |
| | LEAD ADDRESS OF FONT DATA FOR 「D」 |
| 11 (BLUE) | LEAD ADDRESS OF FONT DATA FOR 「B」 |
| | LEAD ADDRESS OF FONT DATA FOR 「L」 |
| | LEAD ADDRESS OF FONT DATA FOR 「U」 |
| | LEAD ADDRESS OF FONT DATA FOR 「E」 |
| 12 (YELLOW) | LEAD ADDRESS OF FONT DATA FOR 「Y」 |
| | LEAD ADDRESS OF FONT DATA FOR 「E」 |
| | LEAD ADDRESS OF FONT DATA FOR 「L」 |
| | LEAD ADDRESS OF FONT DATA FOR 「L」 |
| | LEAD ADDRESS OF FONT DATA FOR 「O」 |
| | LEAD ADDRESS OF FONT DATA FOR 「W」 |
| 13 (GREEN) | LEAD ADDRESS OF FONT DATA FOR 「G」 |
| | LEAD ADDRESS OF FONT DATA FOR 「R」 |
| | LEAD ADDRESS OF FONT DATA FOR 「E」 |
| | LEAD ADDRESS OF FONT DATA FOR 「E」 |
| | LEAD ADDRESS OF FONT DATA FOR 「N」 |
| 14 (BLACK) | LEAD ADDRESS OF FONT DATA FOR 「B」 |
| | LEAD ADDRESS OF FONT DATA FOR 「L」 |
| | LEAD ADDRESS OF FONT DATA FOR 「A」 |
| | LEAD ADDRESS OF FONT DATA FOR 「C」 |
| | LEAD ADDRESS OF FONT DATA FOR 「K」 |
| ⋮ | ⋮ |

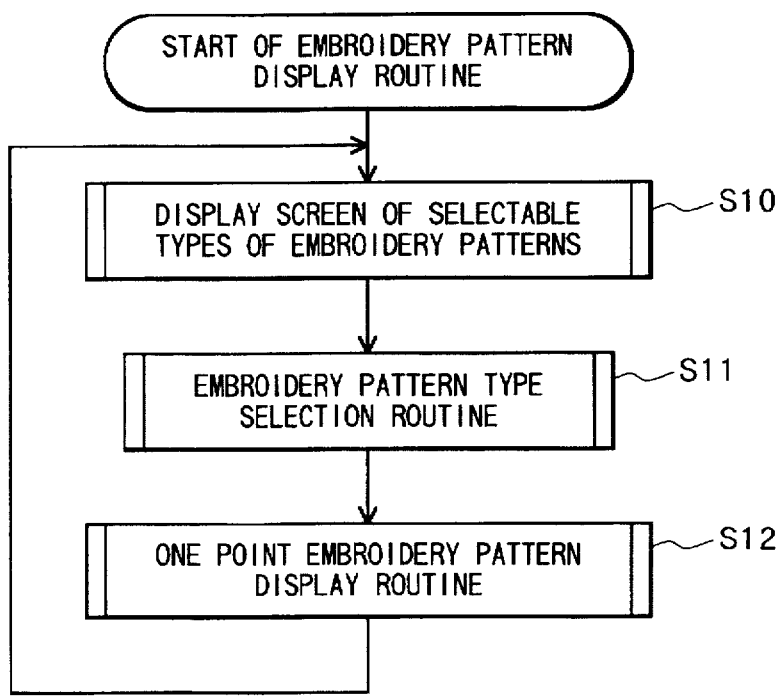

EMBROIDERY SEWING DEVICE AND EXTERNAL MEMORY MEDIUM FOR USE THEREWITH

BACKGROUND OF THE INVENTION

1. Field of the Invention

The present invention relates to an embroidery sewing card ROM used with an embroidery sewing device.

2. Description of the Related Art

There has been known an electrically controlled sewing machine capable of sewing embroidery. The sewing machine includes a display device and a sewing data processor. An external memory, such as a memory card or card ROM, is provided mountable to the sewing machine and is prestored with pattern data for sewing a plurality of different types of embroidery patterns, such as character patterns, many one point patterns, a variety of ornamental sewing patterns, and also a plurality of practical stitch patterns. The sewing machine also includes a display unit having a large liquid crystal display. By displaying the plurality of embroidery patterns on the display unit, a user can select a desired embroidery pattern by manipulating a type selection key to select a desired one from the displayed embroidery patterns.

Each embroidery pattern, such as an elephant pattern or a horse pattern, is configured from a plurality of partial patterns to enable sewing in multi-colors by embroidering each partial pattern in one of a plurality of different colored threads. In this case, when a desired embroidery pattern is selected, all the partial patterns included in the selected embroidery pattern are displayed on a display. At the same time, the thread color of each partial pattern is also displayed with the corresponding partial pattern. In other words, the card ROM stores embroidery sewing data, pattern display data, and a plurality of sets of partial pattern display data for each of plurality of embroidery patterns. The data for displaying thread color is stored integrally with each set of partial pattern display data.

SUMMARY OF THE INVENTION

However, when the partial pattern display data is stored as a single set of image data including the thread color display data a great deal of memory is required to store each set of partial pattern display data. This increases the memory capacity required in the card ROM for storing the pattern data relating to the plurality of embroidery patterns, thereby increasing the cost of the card ROM.

When the card ROM is to be used in a variety of different countries, characters of a plurality of languages, for example, Japanese, English, German, and French, are stored in the card ROM for linguistically displaying the thread colors in correspondence with the partial patterns. This allows the same card ROM to be sold in many countries, thereby simplifying the manufacture and management of the card ROM. The thread colors of the partial patterns are then selectively displayed in the language corresponding to the country in which the sewing machine is used. However, the partial pattern display data including data for the plurality of languages for each partial pattern is also formed from a single set of image data. Therefore, the memory capacity required for the card ROM increases greatly because each set of data for each partial pattern includes data for displaying thread color in each additional language.

It is an objective of the present invention to overcome the above-described problems and to provide an embroidery data processor capable of displaying embroidery patterns using only a minimum memory capacity external memory medium by storing the thread colors for a plurality of partial patterns included in each of a plurality of embroidery patterns as thread indication data in the external memory medium.

To achieve the above-described objective, an external memory medium according to the present invention includes a first storage region storing sets of pattern data relating to a plurality of embroidery patterns, each embroidery pattern including a plurality of partial patterns each to be sewn in a corresponding one of a plurality of thread colors; and a second storage region storing sets of thread color indication data each indicating, from the plurality of thread colors, a corresponding thread color for sewing a corresponding one of the plurality of partial patterns of the plurality of embroidery patterns.

A sewing data processor according to the present invention includes display means for displaying embroidery patterns; an external memory medium mounting portion; an external memory medium detachably mountable to the external memory medium mounting portion and for storing sets of pattern data relating to a plurality of embroidery patterns, each embroidery pattern including a plurality of partial patterns each to be sewn in a corresponding one of a plurality of thread colors and storing sets of thread color indication data each indicating, from the plurality of thread colors, a corresponding thread color for sewing a corresponding one of the plurality of partial patterns of the plurality of embroidery patterns; pattern display control means for displaying at least one of the plurality of embroidery patterns on the display means based on the pattern data; character font memory means storing a first plurality of sets of display font data for displaying a corresponding first plurality of characters required to indicate each of the thread colors in a first predetermined language using at least one character of the first predetermined language, each set of the first plurality of sets of display font data being stored under its lead address in the character font memory; lead address correspondence means storing a plurality of sets of thread color indication data and lead addresses of the first plurality of sets of display font data, each set of thread color indication data indicating a corresponding one of the thread colors and being stored in correspondence with at least one lead address of display font data for displaying the corresponding one of the thread colors in at least a character of the first predetermined language.

With this configuration, font data for displaying a character or characters corresponding to the thread indication data retrieved from the external memory medium can be displayed as the thread color of its corresponding partial pattern.

BRIEF DESCRIPTION OF THE DRAWINGS

The above and other objects, features and advantages of the invention will become more apparent from reading the following description of the preferred embodiment taken in connection with the accompanying drawings in which:

FIG. 4 is a schematic view showing configuration of a thread color indication table stored in one of the storage areas of the memory card;

FIG. 6 is a schematic view showing configuration of a Japanese language lead address table stored in the ROM;

FIG. 7 is a schematic view showing configuration of an English language lead address table stored in the ROM;

FIG. 8 is a flowchart representing an embroidery pattern display routine of the embroidery sewing device;

DETAILED DESCRIPTION OF THE PREFERRED EMBODIMENTS

Figure 1:
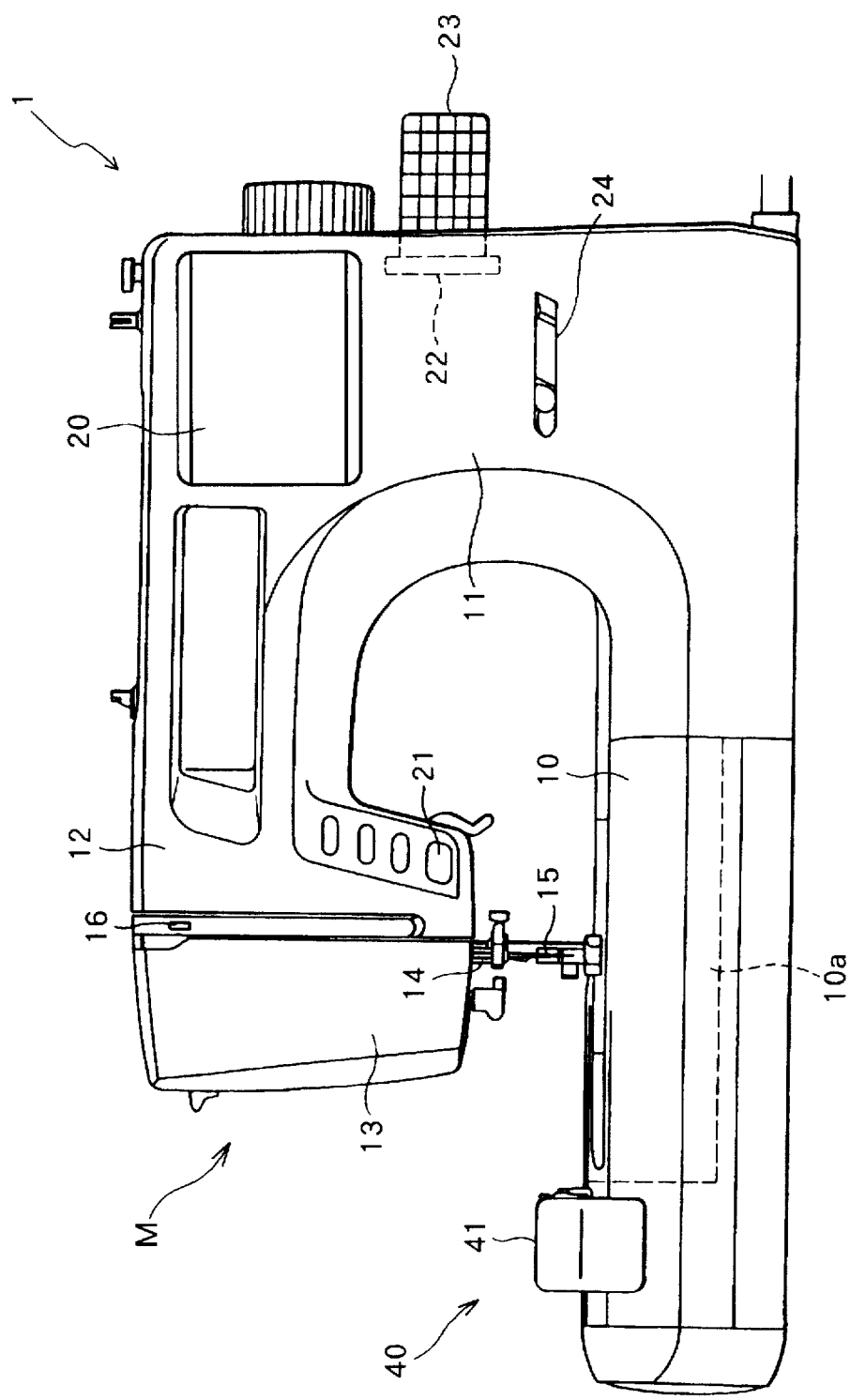
FIG. 1 is a frontal view showing an embroidery sewing device according to a first embodiment of the present invention.

An embroidery sewing device according to a preferred embodiment of the present invention will be described while referring to the accompanying drawings wherein like parts and components are designated by the same reference numerals to avoid duplicating description.

The present embodiment describes the present invention applied to an embroidery sewing device M including an electrically controlled zigzag sewing machine and a mechanism for feeding a workpiece cloth. The embroidery sewing device M includes: an electrically controlled zigzag sewing machine 1 mounted with a needle 15; and a workpiece cloth feeding mechanism 40 capable of embroidery sewing and detachably mounted to the sewing machine 1.

First, an explanation will be provided for the sewing machine 1. The sewing machine 1 includes a bed portion 10; a column portion 11 provided with an upright posture at the right tip portion of the bed portion 10 as viewed in FIG. 1; and an arm portion 12 extending from the column portion 11 leftward as viewed in FIG. 1 in parallel with the bed portion 10. Although, not shown in the drawings, a feed dog vertical movement mechanism for vertically driving a feed dog and a feed dog horizontal movement mechanism for horizontally driving the feed dog are provided to the bed portion 10.

Figure 2:
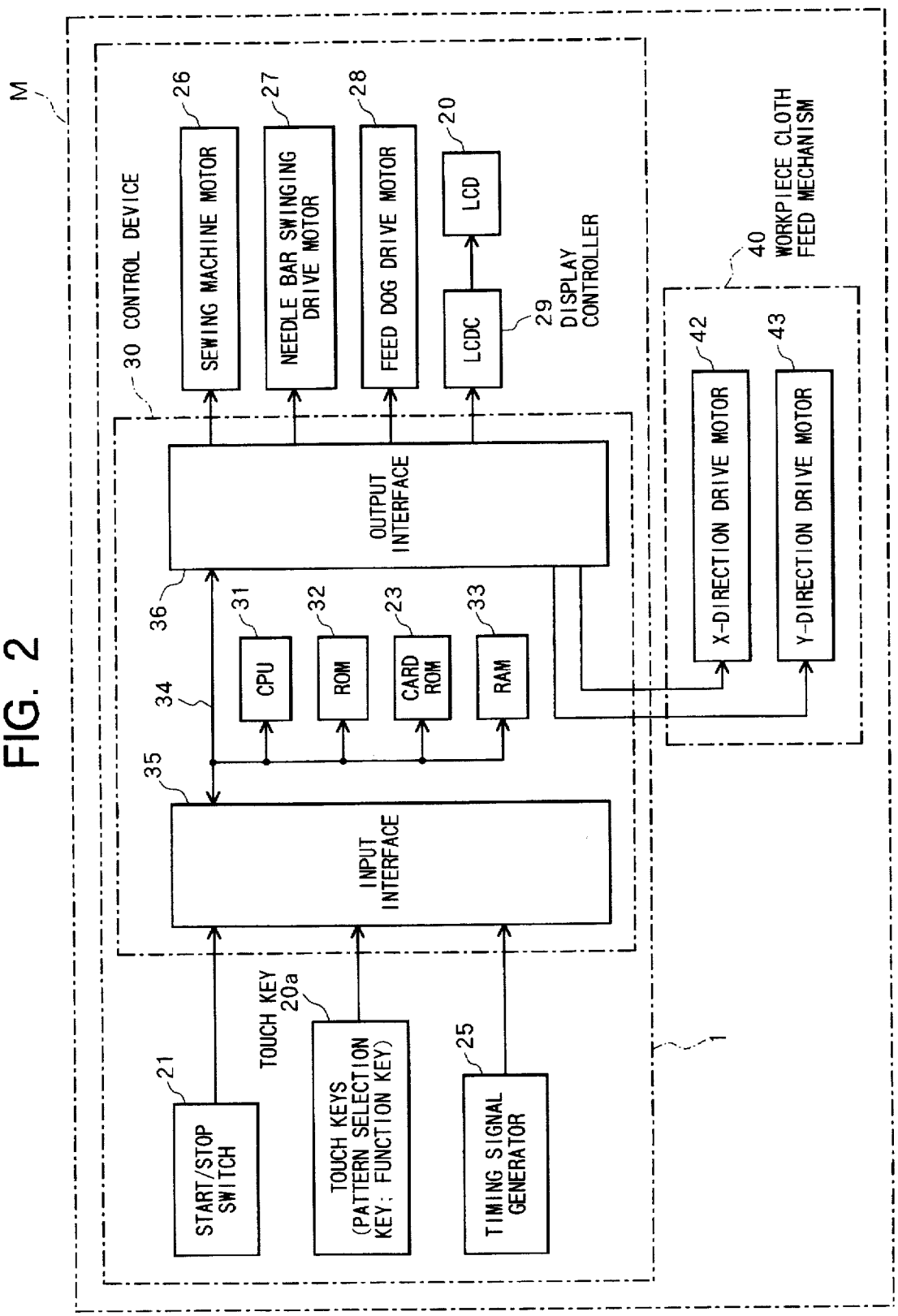
FIG. 2 is a block diagram showing electrical configuration of a control system of the embroidery sewing device of FIG. 1.

Although not shown in the drawings, the arm portion 12 is provided with a needle bar drive mechanism for vertically driving a needle bar 14 with a needle 15 mounted to its lower tip; a needle bar swinging mechanism for swinging the needle bar 14 in a direction perpendicular to the feed direction of the workpiece cloth; and a thread take up lever mechanism for vertically driving a thread take up lever 16 in coordination with vertical drive of the needle bar 14. As shown in FIG. 2, a sewing machine motor 26 is provided for driving the needle bar drive movement mechanism, the lever drive movement mechanism, and the feed dog vertical movement mechanism; a needle bar swing drive motor 27 is provided for driving the needle bar swing mechanism; and a feed dog drive motor 28 is provided for driving the feed dog horizontal movement mechanism. Said differently, a sewing mechanism for driving the needle bar 14 is configured from the needle bar drive movement mechanism, the lever drive movement mechanism, and the like.

A large liquid crystal display 20 capable of displaying a plurality of embroidery patterns and a variety of messages is provided to the front surface of the arm portion 12. A plurality of touch keys 20a formed from transparent electrodes are provided to the display region of display 20. The touch keys 20a serve as pattern selection keys for selecting patterns from embroidery patterns displayed on the display 20 and also serve as functions keys displayed with function names. A start/stop switch 21 for commanding start and stop of sewing operations is provided in the vicinity of a head portion 13 of the arm portion 12. The column portion 11 is provided with a card ROM mounting connector 22 for detachably mounting card ROMs 23, which serve as an external memory; and a speed changing knob 24 for adjusting sewing speed.

A free arm portion 10a is formed to the left tip of the head portion 10. The workpiece cloth feed mechanism 40 capable of sewing large embroidery patterns is detachably mounted to the free arm portion 10a.

An embroidery table 41 is provided to the workpiece cloth feed mechanism 40 movable in a Y-direction, which is parallel to the directions in which feed cloth is reciprocally fed, and an X-direction, which is perpendicular to the Y-direction. Although, not shown in the drawings, a cloth support frame for supporting the workpiece cloth can be detachably mounted to the embroidery table 41. An X-direction drive motor 42 for driving the embroidery table 41 in the X-direction and a Y-direction drive motor 43 for driving the embroidery table 41 in the Y-direction are provided within the main frame of the workpiece cloth feed mechanism 40.

Next, an explanation of essential components of a control system for the embroidery sewing device M will be described while referring to the block drawing in FIG. 2.

The control device 30 of the sewing machine 1 includes a microcomputer, an input interface 35, and an output interface 36. The microcomputer includes a CPU 31, a ROM 32, a card ROM 23, and a RAM 33. The input interface 35 and the output interface 36 are connected to the microcomputer via a bus 34, such as a data bus. Signals from the start/stop switch 21, the touch key 20a, and a timing signal generator 24 are supplied to the microcomputer through the input interface 35. Drive signals and drive pulse signals for driving the machine motor 26, the needle bar swing drive motor 27, the feed dog drive motor 28, and a display controller (LCDC) 29, which is for supplying display signals to the display 20, are supplied from the microcomputer through the output interface 36.

A timing signal generator 25 is connected to the upper shaft of the sewing machine 1 to detect rotational phase of the upper shaft.

The output interface 26 is connected to the X-direction drive motor 42 and the Y-direction drive motor 43 of the workpiece cloth feed mechanism 40. The drive motors 42, 43 are independently driven based on separate drive signals outputted from the control unit 30 to move the embroidery table 41 to a particular position for each stitch using a combination of movements in the X and Y directions, thereby enabling sewing of a variety of embroidery patterns in the workpiece cloth supported in the cloth support frame.

Figure 3:
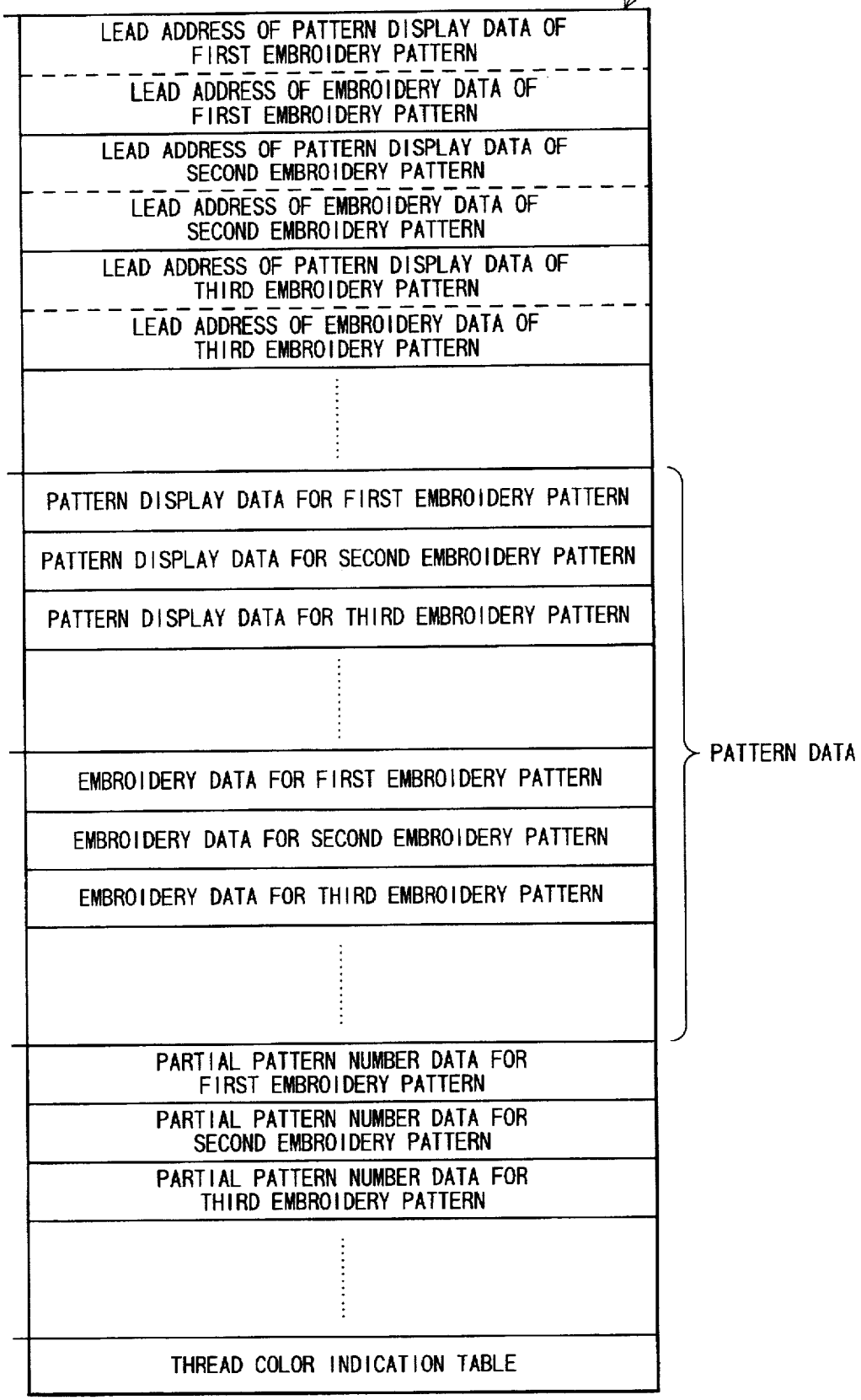
FIG. 3 is a schematic view showing storage areas of a card ROM used in the embroidery sewing device.
Figure 5:
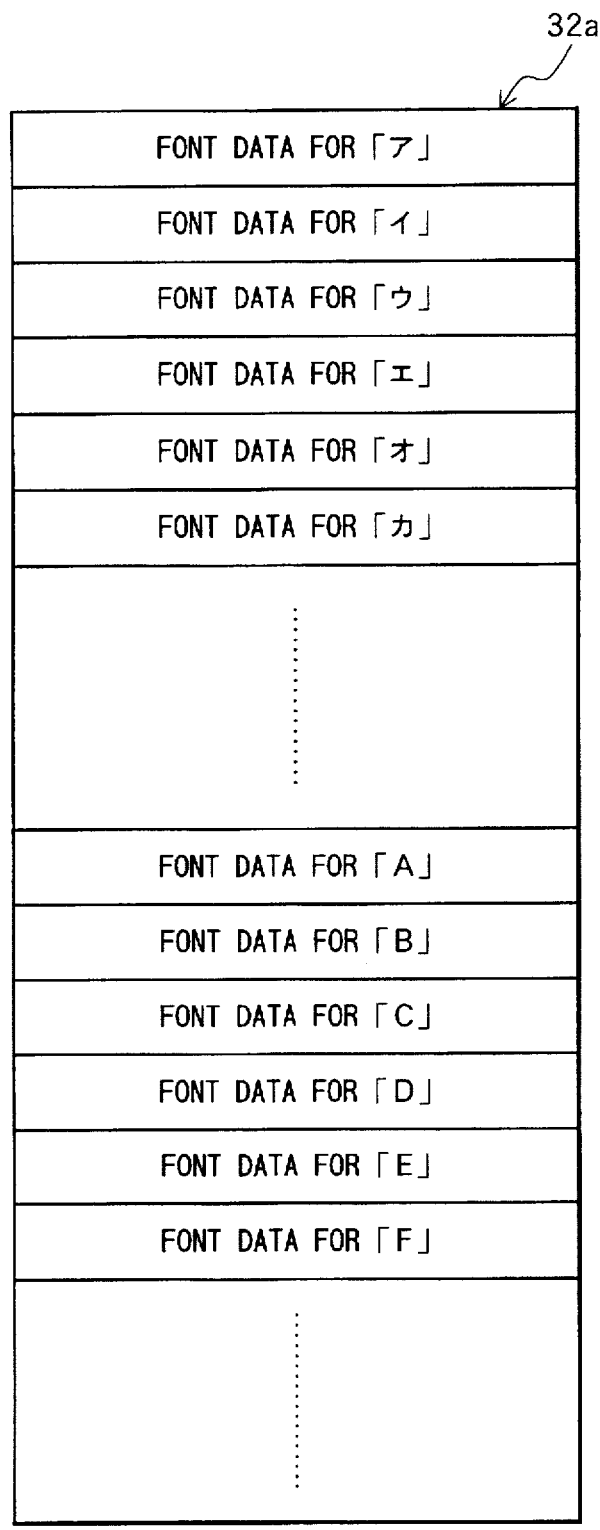
FIG. 5 is a schematic view showing configuration of a character font data memory of a ROM of the embroidery sewing device.

In the present embodiment, one point embroidery patterns including patterns for a panda, an elephant, and a horse are categorized into a plurality of types including animals, people, vehicles, and fruits. Pattern data, which includes pattern display data for displaying each embroidery pattern and embroidery data for sewing each embroidery pattern, is stored in the card ROM 23 for each of the embroidery patterns in the plurality of types. As shown in FIG. 3, the card ROM 23 is divided into different regions storing the pattern data, that is, the pattern display data and embroidery data, for each of embroidery pattern and lead addresses for corresponding set of pattern display data and embroidery data. The pattern display data and the embroidery data will be referred to collectively as pattern data hereinafter.

Figure 15:
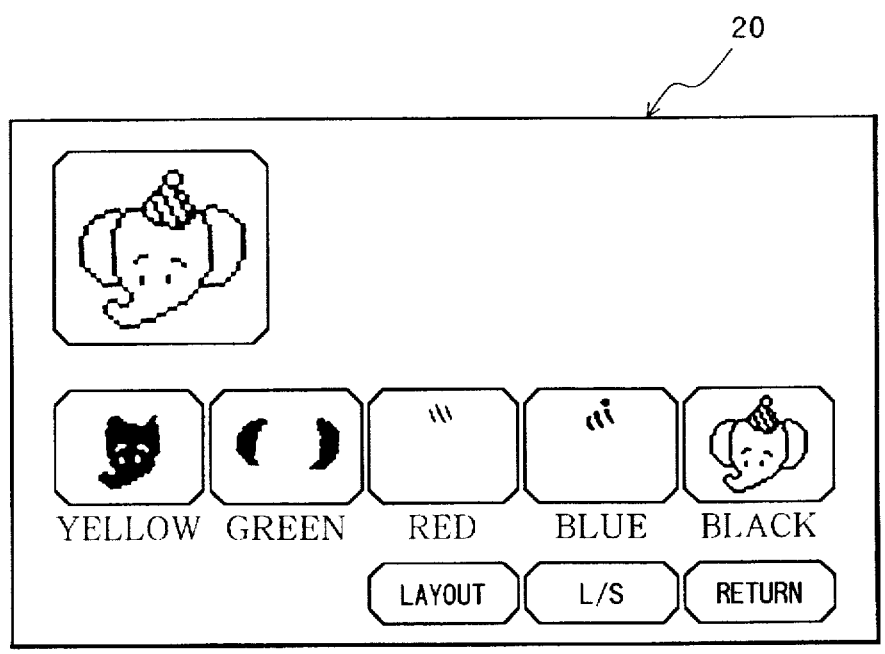
FIG. 15 is a schematic view showing a selected embroidery pattern and its partial patterns displayed on a display of the embroidery sewing device at the start of the pattern selection routine when language information stored in the ROM indicates the English language.

In order to enable colorful embroidery sewing using a plurality of different thread colors, such as red, green, and yellow thread colors, each one point embroidery pattern such as for an animal and a person is divided into a plurality of partial patterns. For example, as shown in FIG. 15, an elephant pattern is displayed (in a manner to be described later) on the display 20 divided into five partial patterns. The pattern data includes data for each partial pattern. That is, the pattern display data includes partial pattern display data for each partial pattern and the embroidery data includes partial embroidery data for each partial pattern. As shown in FIG. 3, the card ROM 23 also stores partial embroidery number data for each embroidery pattern and a thread color indication table indicating thread colors for each partial pattern.

Next, an explanation will be provided for the thread color indication table. As shown in FIG. 4, thread color indication data for each partial pattern is stored grouped by embroidery pattern in the thread color indication table. For example, the second embroidery pattern, for an elephant, includes five partial patterns as mentioned above. Thread color indication data representing the number "12" is prestored for the first partial pattern, which is the elephant's face; thread color indication data representing the number "13" is prestored for the second partial pattern, which is the elephant's ears; thread color indication data representing the number "10" is prestored for the third partial pattern, which is a portion of the elephant's hat; thread color indication data representing the number "11" is prestored for the fourth partial pattern, which is another portion of the elephant's hat; and thread color indication data representing the number "14" is prestored for the fifth partial pattern, which is the outline of the elephant embroidery pattern. The thread color indication data "10" represents the color red, the thread color indication data "11" represents the color blue, the thread color indication data "12" represents the color yellow, the thread color indication data "13" represents the color green, the thread color indication data "14" represents the color black and so on for approximately 30 different types of thread color indication data representing 30 different colors.

The Ram 33 stores language information indicating a language, such as the Japanese language or the English language. The ROM 32 stores an embroidery sewing control program and an embroidery pattern display control program. In order to sew embroidery, the embroidery sewing control program controls drive of the drive motors 27, 28 based on embroidery data of practical stitches, such as zigzag stitches and triple stitches, and controls drive of the drive motors 42, 43 based on embroidery data. Font data for displaying a plurality of characters required to display each of the plurality of thread colors in each of the Japanese and English languages are stored separated by language in the character font memory of the ROM 32.

It should be noted that the Japanese language includes three types of written characters: katakana, hiragana, and kanji. Hiragana and katakana, referred to collectively as kana, include characters representing the Japanese syllabary, or alphabet. Kanji, or Chinese characters as they are often referred, are ideograms pronounced using one or more of the Japanese syllabary. Katakana, hiragana, kanji, and letters of the alphabet will be referred to collectively as characters, hereinafter. In the present embodiment, font data for the katakana characters, such as a, i, u, e, o, and ka, required to display the approximately 30 different thread colors in the Japanese language is stored in the character font memory 32a. Font data for the alphabetic characters, A, B, C, D, E, F, and the like necessary for displaying the approximately 30 different thread colors in the English language are stored in the character font memory 32a.

A Japanese language lead address table TB1 is stored in the ROM 32. As shown in FIG. 6, thread color indication data is stored in the Japanese lead address table TB1 in correspondence with lead addresses in the character font data memory 32a of font data for one or more katakana characters required to display each thread color in katakana characters. Further, an English language lead address table TB2 is also stored in the ROM 32. As shown in FIG. 7, thread color indication data is stored in the English language lead address table TB2 in correspondence with lead addresses in the character font data memory 32a of font data required to display each thread color in one or more alphabetic characters. The RAM 33 is provided with a variety of memories such as counters and buffers required to execute control of stitching and control of embroidery pattern display.

Next, the embroidery pattern display routine executed by the control device 30 of the sewing machine 1 will be explained while referring to the flowcharts shown in FIGS. 8 through 11. It should be noted that symbols Si (i=10, 11, 12 . . . ) refer to individual steps of the routine.

Figure 12:
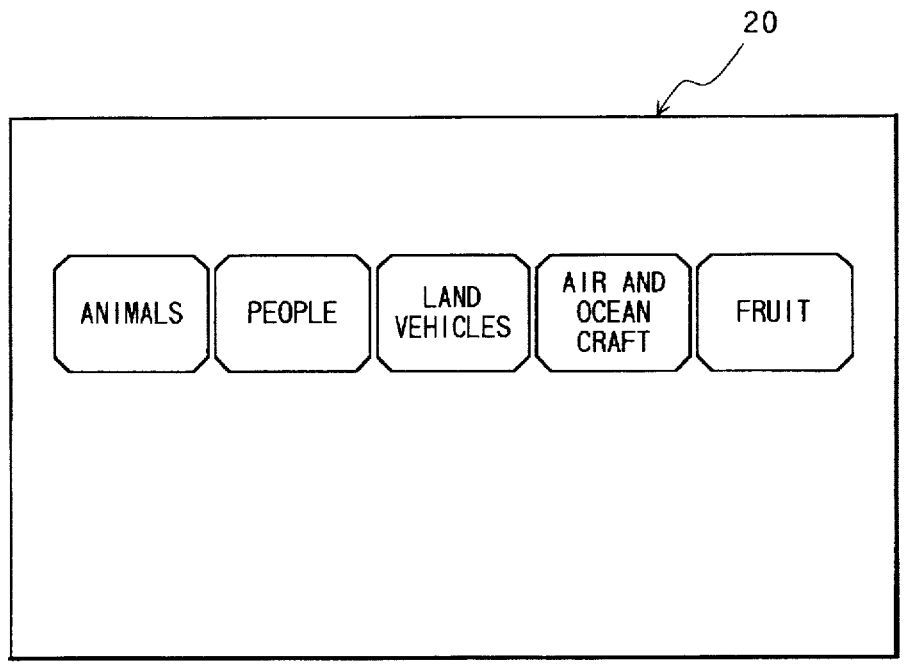
FIG. 12 is a schematic view showing selectable types of embroidery patterns displayed on a display of the embroidery sewing device at the start of the embroidery pattern display routine.

The embroidery pattern display routine is started when the power of the sewing machine 1 is turned on. First, the selection screen for selecting a type of embroidery patterns is displayed on the display 20 in S10. For example, as shown in FIG. 12, selectable types of embroidery patterns, such as animals, people, land craft, air and sea craft, and fruit, are displayed on the display 20. Then, in S11, an embroidery pattern type selection routine enabling the user to select a desired type by pressing its corresponding touch key 20a is executed. Then, the display routine for displaying one point embroidery patterns of the selected type of embroidery pattern is executed in S12.

Figure 9:
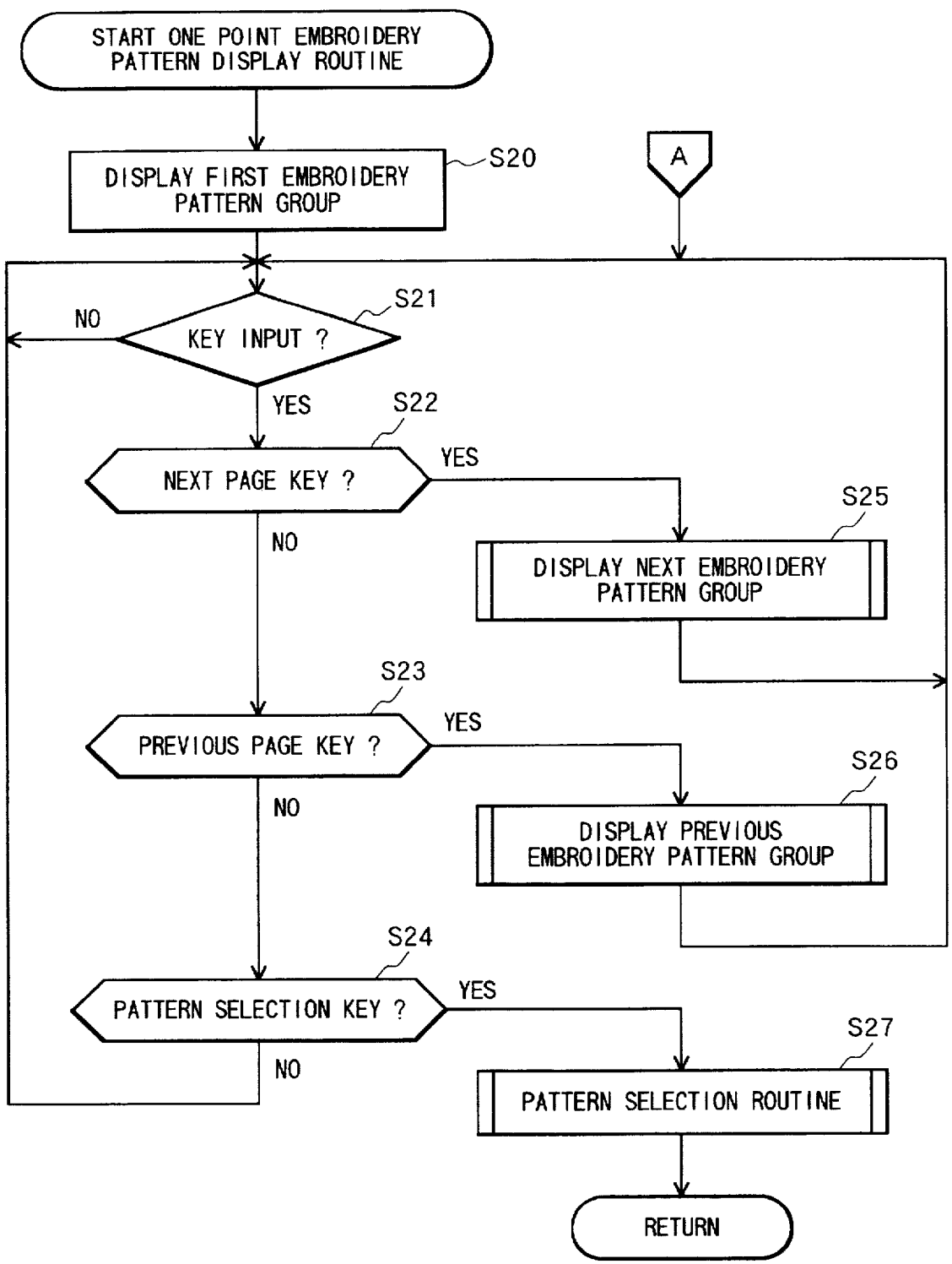
FIG. 9 is a flowchart representing a one point embroidery pattern display routine of the embroidery pattern display routine.
Figure 13:
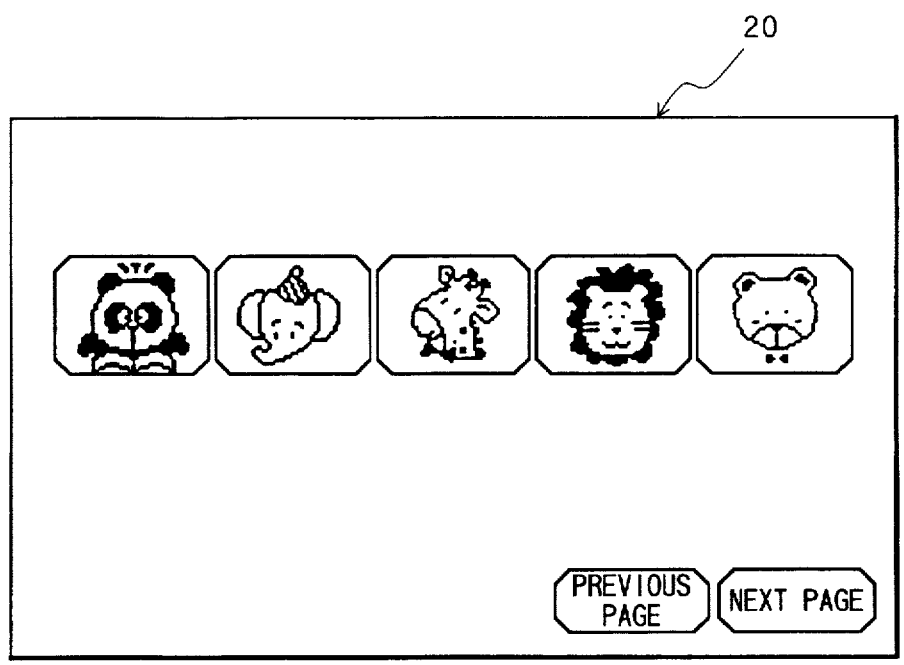
FIG. 13 is a schematic view showing embroidery patterns of a type of embroidery patterns displayed on a display of the embroidery sewing device at the start of the one point embroidery pattern display routine.

The one point embroidery pattern display routine will be explained while referring the flowchart in FIG. 9. At the start of this routine, first, the first embroidery pattern group of the selected type of embroidery pattern is displayed on the display 20 in S20. For example, when the user selects the animal category, then as shown in FIG. 13, of the plurality of embroidery patterns relating to animals, the first embroidery pattern for a panda through fifth embroidery pattern for a bear stored in the card ROM 23 are displayed on the display 20.

Next, when the user manipulates the touch key 20a at the position displaying "NEXT PAGE" (S21, S22:YES), then the embroidery pattern group including the next five embroidery patterns are displayed in S25. Then, the program returns to S21. When the user presses the touch key 20a corresponding to the display of "PREVIOUS PAGE" (S21:YES, S22:NO, S23:YES), then the embroidery pattern group including the previous five embroidery patterns is displayed in S26 and the program returns to S21.

Figure 10:
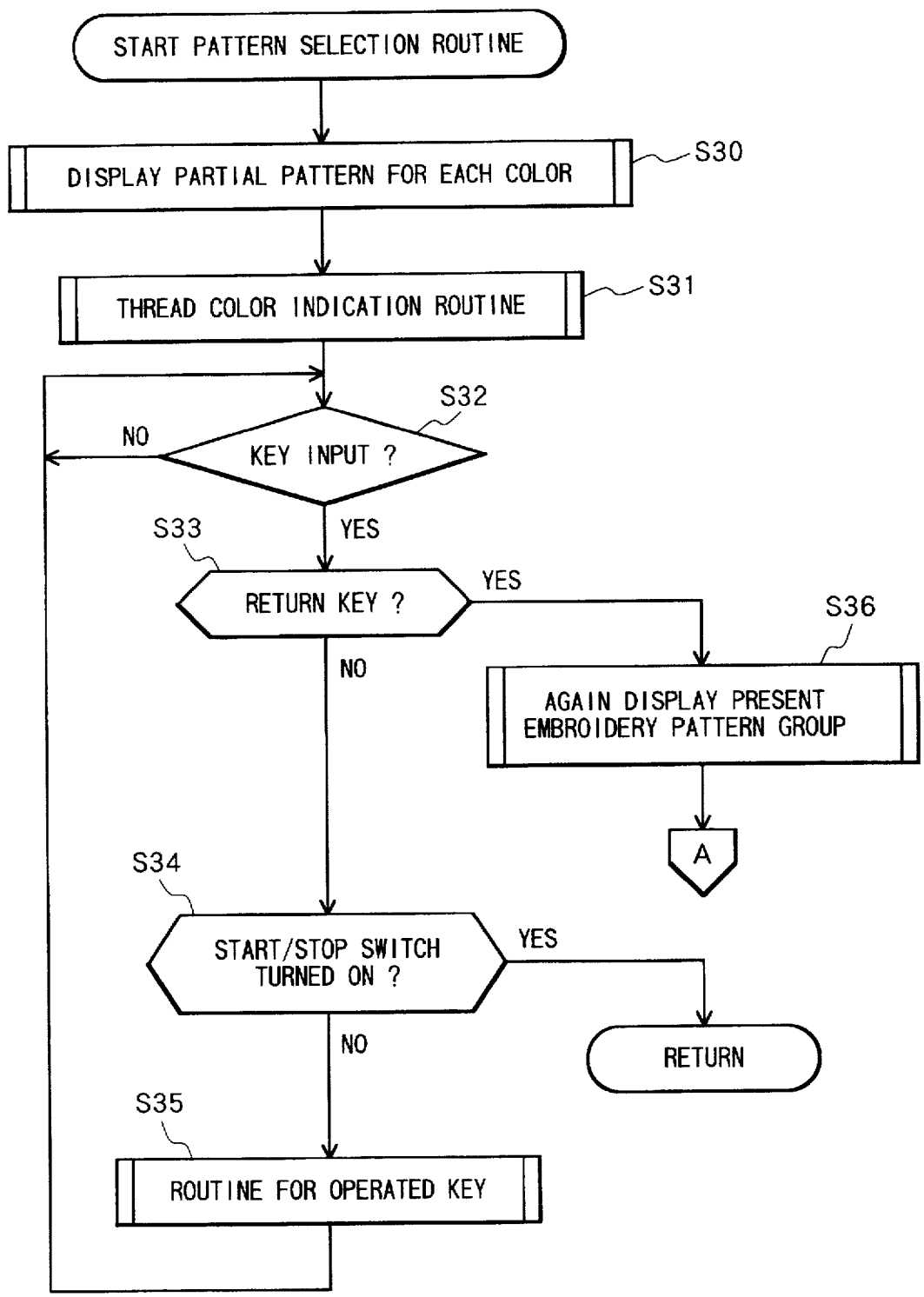
FIG. 10 is a flowchart representing a pattern selection routine of the one point embroidery pattern display routine.
Figure 14:
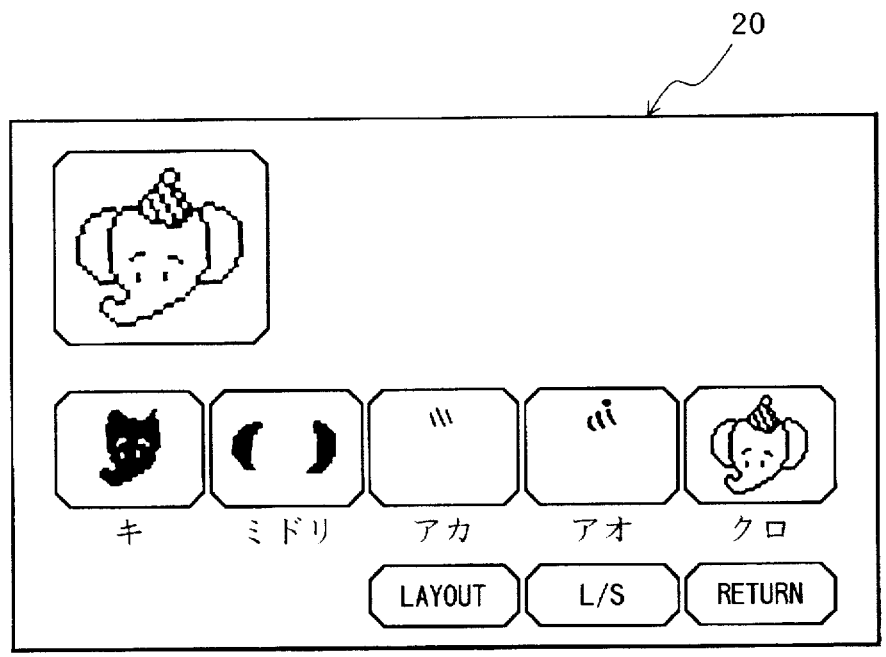
FIG. 14 is a schematic view showing a selected embroidery pattern and its partial patterns displayed on a display of the embroidery sewing device at the start of the pattern selection routine when language information stored in the ROM indicates the Japanese language.

When the user presses the touch key 20a corresponding to a desired embroidery pattern of the displayed embroidery pattern group (S21:YES, S22, 23:NO, S24:YES), then a pattern selection routine represented by the flowchart in FIG. 10 is executed in S27. At the start of the pattern selection routine, first, pattern display data for the embroidery pattern indicated by the pattern selection key is retrieved from the ROM 23 and each of the plurality of partial patterns, each corresponding to one of the thread colors used in the embroidery pattern, is displayed according to sewing order in S30. For example, when the embroidery pattern elephant is selected, then, as shown in FIG. 14, the elephant embroidery pattern and its five partial patterns are displayed.

Figure 11:
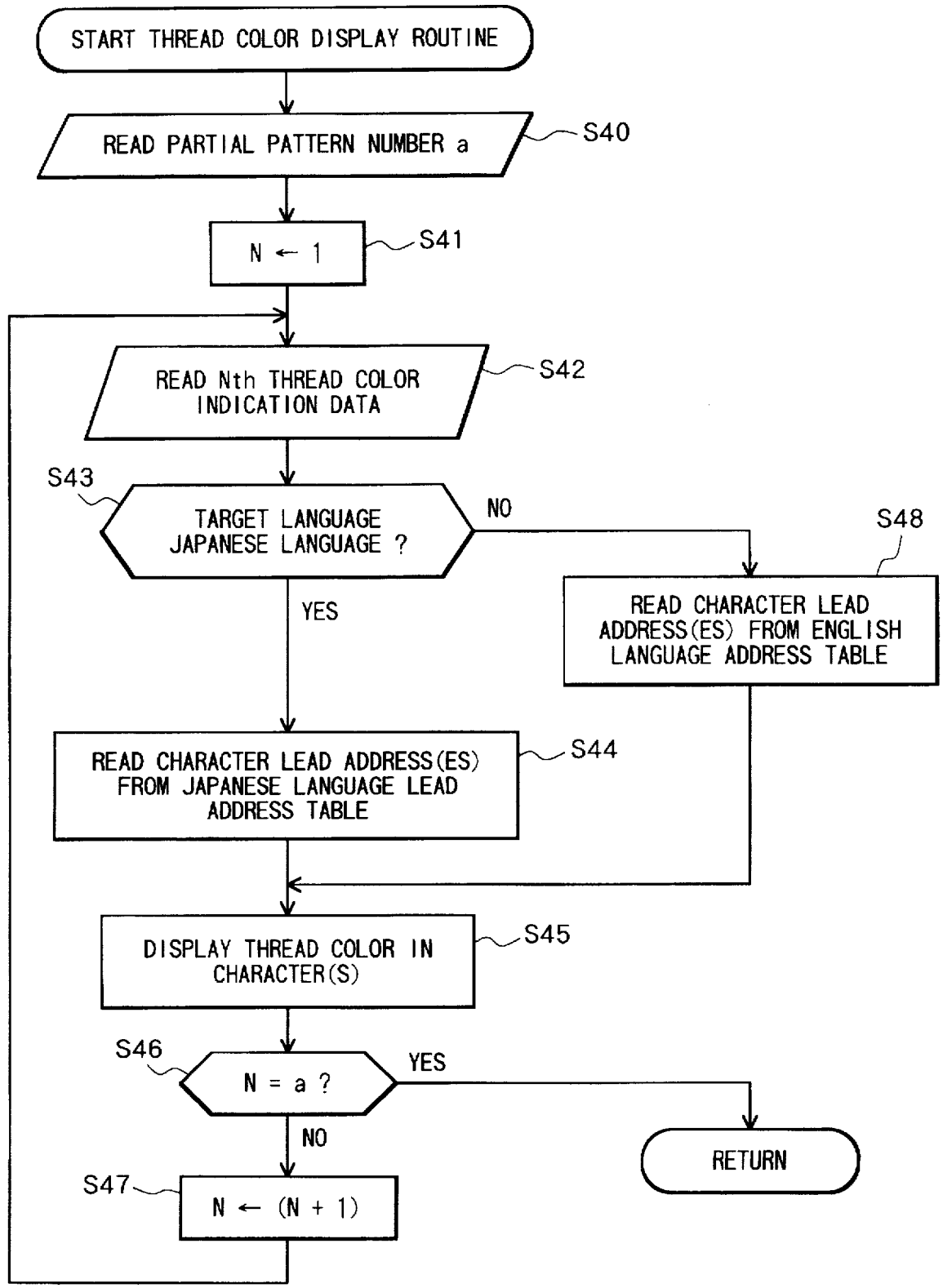
FIG. 11 is a flowchart representing a thread color display routine of the pattern selection routine.

Next, a thread color indication routine represented by the flowchart in FIG. 11 and for indicating thread colors of each partial pattern is executed in S31.

At the start of the thread color indication routine, first, a number representing the total number a of partial patterns in the target embroidery pattern, or elephant pattern in this example, is retrieved from the card ROM 23 in S40. Next, in S41, a counter value N of a partial pattern number counter is set to an initial value of 1. In S42, thread color indication data for the first color, indicated by the partial pattern number value N when it is set to 1, is retrieved from the thread color indication table of the card ROM 23. When it is determined based on the language information stored in the RAM 33 that the target language is the Japanese language (S43:YES), then the lead address or addresses for the at least one katakana character corresponding to the retrieved thread color indication data is read from the Japanese language lead address table TB1 in S44.

Next, in S45, the katakana character of characters corresponding to the thread color are displayed under the corresponding partial pattern based on the lead address or addresses retrieved in S44. When the partial pattern number count value N is not equal to the total number a of partial patterns (S47:NO), then the partial pattern number counter N is incremented one in S47 and then S41 through S47 are repeatedly executed until the partial pattern number counter value N equals the total number a, which means that thread colors for all partial patterns have been displayed. If so (S46:YES), then this routine is ended and the program returns to S32 of the pattern selection routine.

For example, when the embroidery pattern for elephant and its five partial patterns are displayed on the display 20, then, as shown in FIG. 4, the thread color indication data for the first partial pattern of the elephant embroidery pattern is "12," which represents the color yellow. Then, the font data for the katakana character ki, which means yellow in Japanese, is retrieved from the character font data memory 32a based on the lead address stored in the Japanese language lead alphabet table TB1 in correspondence with the thread color indication data "12." Then, in the same manner, display processes are performed and the thread colors for all the five partial patterns of the elephant are displayed in Japanese as shown in FIG. 14 beneath corresponding partial patterns. For example, the katakana character for ki, which means yellow in Japanese, is displayed under the face partial pattern and the katakana characters for midori, which means green in Japanese, are displayed under the ear partial pattern.

On the other hand, when the language indication data indicates the English language during the thread color indication routine (S43:NO), then the lead address or addresses for the one or more alphabetic characters corresponding to the retrieved thread color indication data of each partial pattern are retrieved from the English lead address table TB2 in S48. Then the character font data of the alphabetic characters at the retrieved lead address or addresses is retrieved from the character font data memory 32a and displayed in S45 beneath the corresponding partial pattern. In the same way as for the case when the target language is the Japanese language, S41 through S47 are repeatedly executed until all characters for all thread colors are displayed. For example, when the embroidery pattern elephant and its five partial patterns are displayed on the display 20, then as shown in FIG. 15, the thread color of each the first through fifth partial patterns are displayed linguistically in alphabetic characters under corresponding partial patterns.

If during the pattern selection routine, the user presses the return key (S32, S33:YES), then the embroidery patterns of the presently selected embroidery pattern type are again displayed on the display 20 in S36. Then, the program returns to S21 of the one point embroidery pattern display routine and selection of embroidery patterns for sewing is again possible (S36).

On the other hand, when a key other than the return key or the start/stop switch 21 is operated (S32:YES, S32, S34:NO), then processes corresponding to the operated key are executed in S35 and the routine returns to S32. When the start/stop switch 21 is operated (S32:YES, S33:NO, S34:YES), then this routine and the one point embroidery pattern display routine are ended and the embroidery pattern display routine returns to S10. As a result, when start of embroidery sewing is commanded, a sewing machine motor 26 is driven in cooperation with the sewing mechanism and a workpiece cloth feed mechanism 40 to execute embroidery sewing operations for the embroidery pattern selected in S24.

Next, an explanation will be provided for effects and operations of the embroidery pattern display routine for displaying partial patterns of selected embroidery patterns and thread color of each partial pattern.

As described above, the card ROM 23 stores pattern data of a plurality of embroidery patterns and also stores a thread color indication table with thread color indication data for each of a plurality of partial patterns forming each embroidery pattern. On the other hand, the ROM 32 of the control unit 30 is provided with a character font memory 32a in which is stored display font data categorized by language for displaying a plurality of characters necessary for displaying each type of thread color in characters of each of a predetermined plurality of languages. Also, the ROM 32 of the control unit 30 is provided with a Japanese language lead address table TB1 and an English language lead address table TB2 divided by language. In each of these lead addresses TB1, TB2 are stored thread color indication data in correspondence with lead addresses in the character font memory 32 of font data for displaying one or a plurality of characters representing the corresponding thread colors.

When a desired embroidery pattern is selected from one of the plurality of embroidery patterns displayed on the display 20, then the plurality of partial patterns included in the selected embroidery patterns are displayed. Also, the thread color corresponding to the thread color indication data stored in the card ROM 23 in correspondence with each of the partial patterns is displayed in characters with the corresponding partial patterns. When the language information indicates the Japanese language, then katakana characters for aka, which means red in Japanese, ao, which means blue in Japanese, and the like are displayed on the display 20 based on the thread color indication data. When the language information indicates the English language, then alphabetic characters for red, blue, and the like are displayed with corresponding partial patterns.

By storing a plurality of sets of thread color indication data indicating thread colors of each of the plurality of partial patterns included in each of the plurality patterns, the thread color corresponding to each thread color indication data can be displayed in the characters on the display 20. Therefore, compared to when the thread color indication data is stored as image data for the characters representing the thread color, less data capacity is required so that the memory capacity of the card ROM 23 can be reduced and the size and production cost of the card ROM 23 can be reduced.

Further, even when the card ROM 23 is exported to a country using a different language from a country where it was produced, there is no need to change the data stored in the card ROM 23 or to add additional data. The font data necessary for displaying the thread color in characters of the different language and a language lead address table for that language need only be added to the character font memory 32a of the ROM 32 of the embroidery sewing machine M in which the card ROM 23 is mounted. This makes the card ROM 23 more generally usable.

Next, a second embodiment of the present invention will be described.

Figure 16:
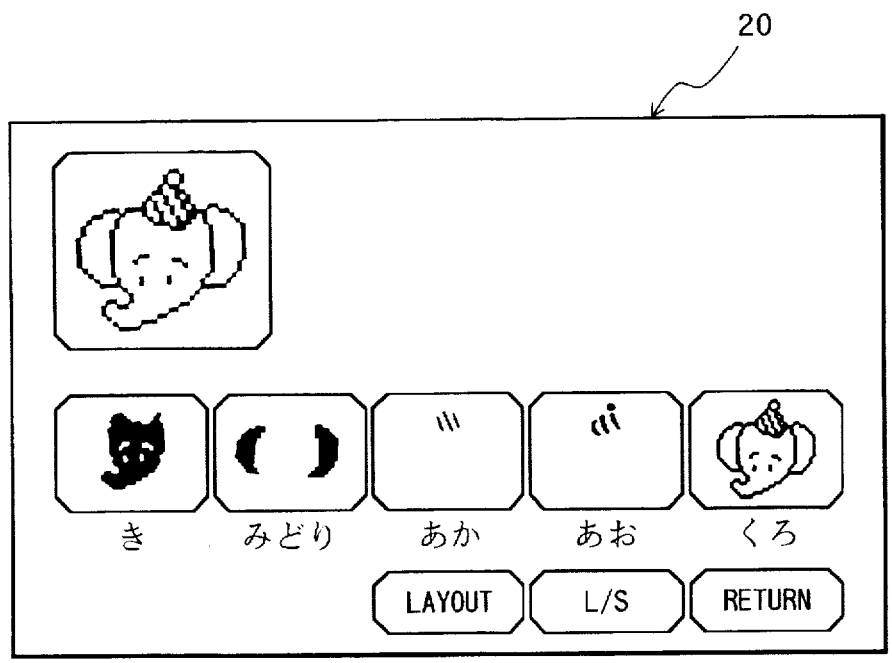
FIG. 16 is a schematic view showing a selected embroidery pattern and its partial patterns displayed on a display of the embroidery sewing device at the start of the pattern selection routine when language information stored in the ROM indicates the hiragana writing type of the Japanese language.
Figure 17:
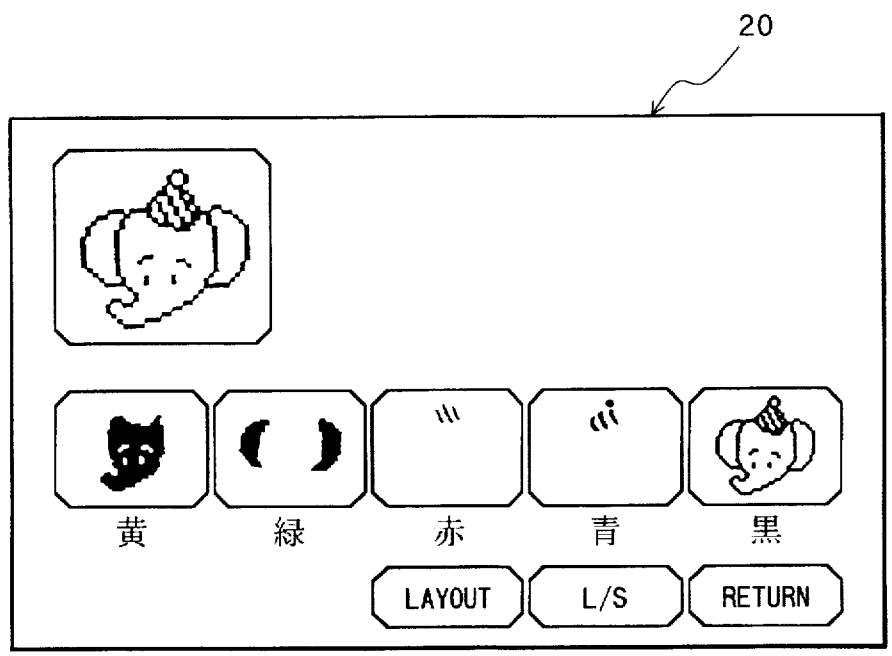
FIG. 17 is a schematic view showing a selected embroidery pattern and its partial patterns displayed on a display of the embroidery sewing device at the start of the pattern selection routine when language information stored in the ROM indicates the kanji writing type of the Japanese language.
Figure 18:
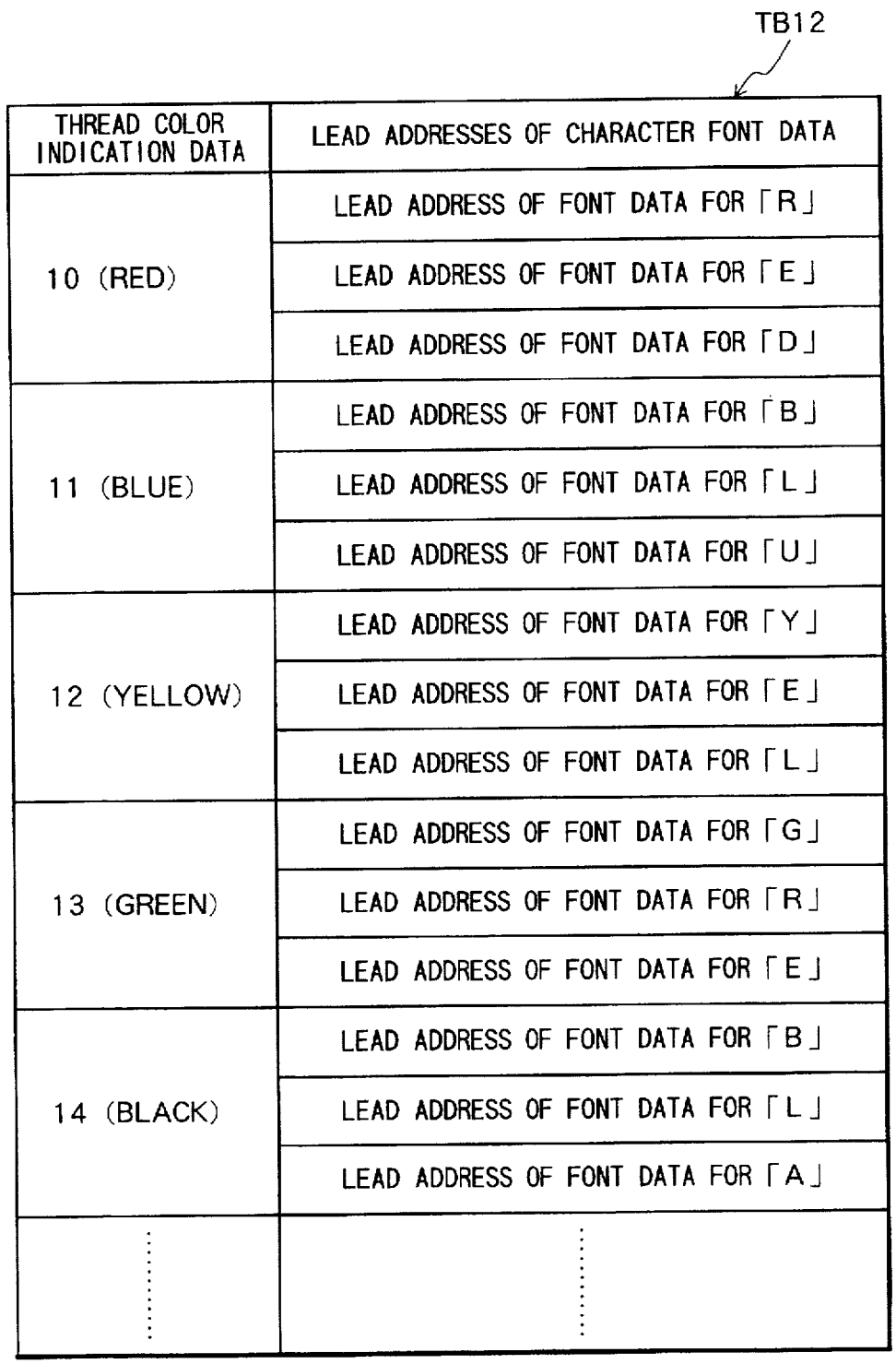
FIG. 18 is a schematic view showing configuration of an abbreviated English language lead address table stored in the ROM.

As mentioned above, the Japanese language has three types of written characters, that is, in addition to katakana characters, the Japanese language also includes hiragana characters and kanji characters. In the second preferred embodiment, character font data for hiragana characters of the Japanese syllabary needed to display the 30 thread colors in hiragana characters and also, character font data for displaying the 30 thread colors in kanji characters is stored in the character font memory 32a of the ROM 32. These are stored categorized by type of written character. That is, a hiragana lead address table for displaying the thread colors in hiragana characters and a kanji lead address table for displaying the thread colors in kanji characters are stored in the ROM 32. When the language information stored in the ROM 32 indicates Japanese and hiragana, then as shown in FIG. 16, the thread color of each partial pattern is displayed on the display 20 in hiragana characters based on the Japanese hiragana lead address table. On the other hand, when the language indication indicates Japanese language and kanji characters, then as shown in FIG. 17, the thread color for each partial pattern is displayed in kanji characters based on the Japanese kanji lead address table.

Next, an explanation will be provided for a third embodiment of the present invention.

Figure 19:
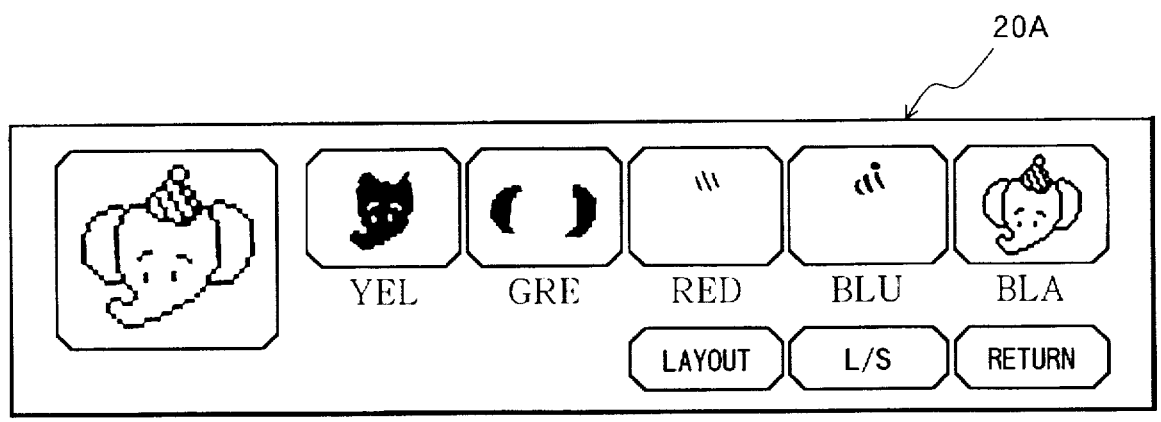
FIG. 19 is a schematic view showing a selected embroidery pattern and its partial patterns displayed on a small display of a small embroidery sewing device at the start of the pattern selection routine when language information stored in the ROM indicates the English language in abbreviated form.

In the third embodiment, an abbreviated English language lead address table TB12 is provided in the ROM 32. The abbreviated English language lead address TB12 stores each thread color in correspondence with only the first three alphabetic characters of the English word of the thread color. For example, the thread color blue is stored as BLU, and the thread color yellow is stored as YEL. During the thread color display routine, when the language information indicates English and abbreviation, then as shown in FIG. 19, based on the abbreviated English lead address table TB12, the thread colors are displayed in abbreviated form, for example, YEL and GRE for the yellow and green thread colors, under corresponding partial patterns in a narrow display space of a small display 20. Thread colors can be further abbreviated to only one letter for each thread color. For example, yellow can be abbreviated as Y and red can be abbreviated as R. This configuration would be beneficial for displaying thread color on a small display with insufficient space to display complete words.

While the invention has been described in detail with reference to specific embodiments thereof, it would be apparent to those skilled in the art that various changes and modifications may be made therein without departing from the spirit of the invention, the scope of which is defined by the attached claims.

For example, only pattern display data for a plurality of embroidery patterns need be stored in the card ROM 23. In this case, embroidery data can be developed from the embroidery display data as required. Also, only embroidery data need be stored in the card ROM 23. In this case, embroidery display data can be developed from the embroidery data. Further, general pattern data capable of being developed into either pattern display data or embroidery data can be stored in the card ROM 23 and developed into either pattern display data or embroidery data as needed. A variety of lead address tables for a variety of languages can be stored in the ROM 23. In this case, display font data for the plurality of languages can be stored in the character font memory 32a and thread color is displayed in a desired one of the plurality of languages.

Based on the language information and the thread color data for each partial pattern included in each embroidery pattern, the lead address or addresses of font data for displaying, in characters, the thread color corresponding to the thread color indication data can be determined by a predetermined calculation formula. A variety of detachable external memory media, such as an electromagnetic memory medium or an optical memory medium, can be used instead of the card ROM 23.

The present invention can be applied to a variety of embroidery sewing card ROMs, to a variety of embroidery sewing devices capable of sewing embroidery by producing relative movement between a needle 15 and a cloth support frame; to a variety of embroidery sewing devices capable of sewing embroidery by using a feed dog to move the workpiece cloth in the leftward, rightward, frontward, and backward directions; and to a variety of sewing data processors capable of displaying embroidery patterns without being provided with a embroidery sewing mechanism.

Only font data for a single target language need be stored in the ROM of the embroidery sewing device. When the embroidery sewing device is produced for use in a particular target country, the font data for characters of the language used in the target country need only be stored in the ROM. In this case, because font data for other languages and for the language information can be dispensed with, the capacity required for the ROM of the embroidery sewing device can be reduced.

What is claimed is:

1. An external memory medium detachably mountable to an external memory medium mounting portion of an embroidery data processor, the external memory medium comprising:

a first storage region that stores sets of pattern data relating to a plurality of embroidery patterns, each embroidery pattern including a plurality of partial patterns each to be sewn in a corresponding one of a plurality of thread colors; and a second storage region that stores sets of thread color indication data, each set of thread color indication data indicating a corresponding thread color for sewing a corresponding one of the plurality of partial patterns of the plurality of embroidery patterns; and wherein the first storage region and the second storage region are located in different memory areas and have separate addresses.

2. An external memory medium as claimed in claim 1, wherein the second storage region stores the thread color indication data in order in which corresponding partial patterns of each embroidery pattern are to be sewn.

3. An external memory medium as claimed in claim 1, wherein the pattern data includes sets of pattern display data for displaying corresponding embroidery patterns and sets of embroidery data for sewing corresponding embroidery patterns using a sewing machine, each set of pattern display data and embroidery data being stored under a separate lead address, and further comprising a third storage region storing the lead addresses of sets of pattern display data and embroidery data corresponding to a same embroidery pattern under a common lead address.

4. An external memory medium as claimed in claim 1, further comprising a fourth storage region that stores, for each embroidery pattern, partial pattern number data indicating a number of partial patterns in each embroidery pattern.

5. A sewing data processor capable of displaying embroidery patterns, comprising:

display means for displaying embroidery patterns;
   an external memory medium mounting portion;
   an external memory medium detachably mountable to the external memory medium mounting portion that stores sets of pattern data relating to a plurality of embroidery patterns, each embroidery pattern including a plurality of partial patterns each to be sewn in a corresponding one of a plurality of thread colors and stores sets of thread color indication data, each set of thread color indication data indicating a corresponding thread color for sewing a corresponding one of the plurality of partial patterns of the plurality of embroidery patterns;

pattern display control means for displaying at least one of the plurality of embroidery patterns on the display means based on the pattern data;

character font memory means for storing a first plurality of sets of display font data for displaying a corresponding first plurality of characters required to indicate each of the thread colors in a first predetermined language using at least one character of the first predetermined language, each set of the first plurality of sets of display font data being stored under its lead address in the character font memory; and lead address correspondence means for storing a plurality of sets of thread color indication data and lead addresses of the first plurality of sets of display font data, each set of thread color indication data indicating a corresponding one of the thread colors and being stored in correspondence with at least one lead address of display font data for displaying the corresponding one of the thread colors in at least a character of the first predetermined language.

6. A sewing data processor as claimed in claim 5, wherein:

the character font memory means further stores a second plurality of sets of display font data of a corresponding second plurality of characters required to display each thread color in a second predetermined language using at least one character of the second predetermined language, each set of the second plurality of sets of display font data being stored under its lead address in the character font memory; and the lead address correspondence means further stores the lead addresses of the second plurality of sets of display font data, each set of thread color indication data being stored in correspondence with at least one lead address of display font data for displaying a corresponding one of the thread colors in at least a character of the second predetermined language.

7. A sewing data processor as claimed in claim 6, further comprising a language memory for storing language information indicating one of the first predetermined language and the second predetermined language in which thread colors are to be displayed on the display means.

8. A sewing data processor as claimed in claim 7, wherein:

the character font memory means further stores a third plurality of sets of display font data of a third plurality of characters required to display each thread color in a different writing type of the first predetermined language using at least one character of the different writing type of the first predetermined language, each set of the third plurality of sets of display font data being stored under its lead address in the character font memory, the different writing type being different from a writing type represented by the second set of display font data;

the lead address correspondence means further stores the lead addresses of the third plurality of sets of display font data, each set of thread color indication data being stored in correspondence with at least one lead address of display font data for displaying a corresponding one of the thread colors in at least a character of the different writing type of the first predetermined language.

9. A sewing data processor as claimed in claim 8, wherein the language memory further stores writing type data indicating one of the writing type and the different writing type when the language information indicates the first predetermined language.

10. A sewing data processor as claimed in claim 5, wherein:

the character font memory means further stores a second plurality of sets of display font data of a second plurality of characters required to display each thread color in a different writing type of the first predetermined language using at least one character of the different writing type of the first predetermined language, each set of the second plurality of sets of display font data being stored under its lead address in the character font memory, the different writing type being different from a writing type represented by the first set of display font data; and the lead address correspondence means further stores the lead addresses of the second plurality of sets of display font data, each set of thread color indication data being stored in correspondence with at least one lead address of display font data for displaying a corresponding one of the thread colors in at least a character of the different writing type of the first predetermined language.

11. A sewing data processor as claimed in claim 10, further comprising a language memory that stores writing type data indicating one of the writing type and the different writing type when the language information indicates the first predetermined language.

12. A sewing data processor as claimed in claim 5, wherein the lead address correspondence means stores each set of thread color indication data in correspondence with lead addresses of display font data for displaying the corresponding one of the thread colors in abbreviated form in the first predetermined language.

13. A sewing data processor as claimed in claim 5, wherein the embroidery data processor is mounted in an embroidery sewing machine for performing embroidery sewing.

14. A sewing data processor as claimed in claim 13, further comprising a language memory for storing language information indicating one of the first predetermined language and a second predetermined language in which thread colors are to be displayed on the display means.

15. A sewing data processor as claimed in claim 5, wherein the embroidery data processor is mounted in a device for performing at least preparation and editing of the sewing data for embroidery.

16. A sewing data processor as claimed in claim 15, further comprising a language memory for storing language information indicating one of the first predetermined language and a second predetermined language in which thread colors are to be displayed on the display means.

17. A sewing data processor as claimed in claim 5, wherein the external memory medium stores the thread color indication data in order in which corresponding partial patterns of each embroidery pattern are to be sewn.

18. A sewing data processor as claimed in claim 17, wherein the pattern data stored in the external memory medium includes sets of pattern display data for displaying corresponding embroidery patterns and sets of embroidery data for sewing corresponding embroidery patterns using a sewing machine, each set of pattern display data and embroidery data being stored under a separate lead address, the external memory medium further storing the lead addresses of sets of pattern display data and embroidery data corresponding to a same embroidery pattern under a common lead address.

19. A sewing data processor as claimed in claim 17, wherein the pattern display control means displays partial patterns of the at least one of the plurality of embroidery patterns in the order in which the partial patterns are to be sewn.

20. A sewing data processor as claimed in claim 5, wherein the lead address correspondence means stores lead addresses of display font data for displaying the corresponding one of the thread colors in a plurality of characters of the first predetermined language.

21. A sewing data processor capable of displaying embroidery patterns, comprising:

display means for displaying embroidery patterns;

an external memory medium mounting portion;

an external memory medium detachably mountable to the external memory medium mounting portion that stores sets of pattern data relating to a plurality of embroidery patterns in a first storage region, each embroidery pattern including a plurality of partial patterns each to be sewn in a corresponding one of a plurality of thread colors, and stores sets of thread color indication data in a second storage region, each set of thread color indication data indicating a corresponding thread color for sewing a corresponding one of the plurality of partial patterns of the plurality of embroidery patterns, wherein the first storage region and the second storage region are located in different memory areas and have separate addresses; and pattern display control means for displaying, on the display means, at least one of the plurality of embroidery patterns and color information corresponding to the at least one of the plurality of embroidery patterns, based on the pattern data and the thread color indication data.

* * * * *